2,907,665

VITREOUS ENAMEL

John T. Fraher, Reseda, Calif., assignor to Consolidated Electrodynamics Corporation, Pasadena, Calif., a corporation of California No Drawing. Application December 17, 1956
Serial No. 628,562

5 Claims. (Cl. 106—49)

This invention relates to inorganic vitreous enamel coatings for metals, glasses and refractories.

A coating material of high resistivity with ability to stand exposure to high temperatures, and which may be bonded to such materials as stainless steel, glass, and the like, has long been sought. In the field of high temperature instrumentation alone such a coating would have a widespread application as wire insulation in the manufacture of bonded strain gauges, insulating bushings for high temperature leads, and many other examples. To date no material has been developed which combines, to the necessary degree, the properties of resistivity, temperature stability, durability and adherence to metals and refractories.

I have now discovered a coating composition combining these properties to such a degree as to afford new avenues of instrument design. The new coating composition has the further striking advantage of being susceptible to adjustment of constituent proportions so as to permit variations in thermal coefficients and other properties, enabling most advantageous application to various materials.

The coating material of the invention consists entirely of inorganic metal oxides and salts, and can properly be referred to as vitreous enamel or as a ceramic. The term "ceramic" is used as denoting a composition including a metallo-silicon oxide compound or complex. The composition consists generally of two fractions, a frit and a flux, the latter being present in greater proportions than the frit in all variations of the composition. The frit comprises a mixture of zinc oxide, cobalt oxide and silicon oxide, and the flux comprises a mixture of lead borate and lead borosilicate.

Providing all of the components listed above are present in the material, and providing further than the flux is used in greater proportion than the frit, it is possible to vary the composition of the fractions within certain limits.

The frit is preferably composed of equal parts by weight of zinc oxide, cobalt oxide and silicon oxide (silica), although each of these constituent components may be present in a range varying from about 10% to about 50% by weight of frit. This variation in proportion to the components of the frit is subject to the limitation that the final composition, including the mixture of the frit and flux, include not less than 1% by weight of silica. As will become apparent upon describing the variations permissible in the proportioning of the frit and flux in the final composition, this limitation on the silica content of the coating material will necessitate in some instances the use of silica in the base in an amount in excess of the lower limit of 10% specified.

The preferred composition of the flux is approximately 65% by weight of lead borate and 35% by weight of lead borosilicate. Although this represents a preferred composition, the flux may be composed of from 40% to 75% by weight of lead borate and from 25% to 60% by weight of lead borosilicate.

The preferred coating composition, as it exists prior to application, comprises a dry powder consisting of 10% of the frit in its preferred form and 90% of the flux in its preferred form. To vary certain properties of the material and without destroying its significant value, the overall composition may be varied within the range of 2% to 40% by weight of frit and 60% to 98% by weight of flux, provided, as mentioned above, that sufficient silica is embodied in the frit so that in the proportionate use of this fraction in the final material at least 1% by weight of silica will result.

In general, an increase in the proportion of flux to frit results in a reduction of the required firing temperature, whereas a decrease in flux in proportions to the frit, all within the limits defined, results in an increase in firing temperature. The term "firing temperature" here has reference to the temperature at which the material is fused after application to a base metal or refractory to form a desired coating.

To prepare the coating material the frit ingredients are mixed in the desired proportion within the range specified above and there results a grayish-white powder. This powder is fired at a temperature between 2000° F. and 2800° F. and preferably at about 2400° F., whereupon the ingredients fuse and change to a bright blue color. This fused mass is then ground, preferably to about 400 mesh, and mixed with the desired proportion of flux, the flux having been previously prepared by simply mixing the constituents thereof. The resultant mixture is a fine powder of light blue color which is indefinitely stable in storage, and which is ready for use as desired. To insure intimate mixture of the frit in flux, the final product may be tumbled in a ball mill for a period of time.

In applying this material as a high temperature resistive coating, numerous techniques may be employed. One satisfactory procedure is to suspend the mixture in a suitable liquid medium such as water, acetone, or any readily vaporizable fluid, and spray the resultant suspension directly on the member or part to be coated. If the preferred composition is employed, the part thus coated with a suspension of the material is fired at a temperature between about 1100° F. and 1350° F. for a period sufficient to permit the coating to fuse, say about 20 minutes, during which it bonds itself to the part. In this method of preparation the thickness of the coating may be determined by the concentration of the sprayed suspension, by the type of spray equipment employed, and by the manner of spraying. In general it is desirable to control these parameters to produce a coating somewhere between .0005 and .002 inch. In general I have found that the thinner coatings exhibit the best properties of adherence and resilience, the resistance of the material being sufficiently great that even the thin coatings are possessed of very high resistivity.

Alternatively, a suspension of the material may be brushed on the surface to be coated or may be dusted thereon as a fine powder. In any instance, after application of the desired quantity of the unfired powder to the surface to be coated, firing is carried out as above described.

A convenient method of handling the material is in a fire lacquer suspension. A predetermined amount of the enamel powder, which may vary over wide limits, is mixed into a cellulose nitrate lacquer. This results in a liquid suspension easy to apply by spraying, dipping, or in patterns through the silk screen process. The fluid is thinned to the proper consistency for each application method with butyl Cellosolve. After coating, the part is air dried for a period to allow the lacquer solvents to evaporate, after which the coated part is placed in a vented furnace at about 500° F. This volatilizes the organic fraction of the suspension, leaving the ceramic component with a smooth, even surface. The furnace temperature is then elevated in the normal manner to the firing or maturing temperature of the enamel to complete the operation.

As mentioned above, variation in the relative proportions of the flux and frit accomplishes a change in required firing temperature. If the flux fraction is present in the preferred amount of approximately 90%, firing is carried out at 1100° F. to 1300° F., as stated above. If the proportions of flux and frit are changed to 70% flux and 30% frit, the firing temperature is as a consequence raised by about 150° F. to 200° F. The importance of this variation in firing temperature is a function of the temperature characteristics of the material to be coated and the application to which the coated part is to be put.

To illustrate the novel and exceedingly useful character of the coating of the invention, the electrical and physical properties of the material as a coating are given below:

Density=3.6 gm./cm.$^3$ at 70° F.
Modulus of elasticity=$10 \times 10^6$ pounds/in.$^2$.
(Note.—The modulus of elasticity was determined from the slope of the stress, strain curves of a solid bar of the material and also from the difference in deflection of a bare steel cantilever beam and a coated beam in each case loaded at the free end.)
Thermal expansion coefficient=$3.5 \times 10^{-6}$/° F.
(Note.—This coefficient is quite linear between 70° F. and 700° F. and the value reported is the average over this range.)
Electrical resistivity
 =$\alpha 10^{11}$ ohm cm. at 70° F.
 =$\alpha 10^6$ ohm cm. at 900° F.
(Note.—The activation energy for ions to overcome to conduct is about 1.2 electron volts per molecule or 25 kilocalories per mole.)
Dielectric constant=$\alpha 25$ at 1 kc., 70° F.
(Note.—The dielectric constant increases exponentially with the square of the temperature and is about 2500 at 900° F. determined at 1 kc.)

The properties of the enamel may be modified for specific applications by the addition of very small quantities of suitable adulterants. Although the invention is not in any way limited to the use of any modifiers or adulterants with the basic enamel composition as defined, a few examples of such materials and their effects are as follows:

(1) Titanium oxide promotes acid resistance and abrasion resistance in thin films at the expense of a loss of gloss and an increased tendency for crystallization at the surface.

(2) Nickel oxide may be used in amounts of from about 0.5% to about 3% by weight of the frit as an inexpensive substitute for an equivalent amount of the more expensive cobalt oxide at the expense of a general degradation of the enamel.

(3) Manganese dioxide may be added in amounts not to exceed about 1.5% by weight of the frit to increase the bonding strength of the enamel to high iron content alloys at the expense of an increase in the brittleness of the coating.

(4) Lithium titanate improves acid resistance and acts as a flux to lower firing temperature and increase fluidity. May be used in amounts ranging from about 1% to about 1.5% by weight of frit.

(5) Lithium zirconate in amounts of from about 0.5% to about 1% by weight of the frit will reduce pinholing where this problem is encountered.

(6) The following materials may be added in amounts of less than about 1% by weight of the frit to increase the opacity of the enamel where required:

Tin oxide
Zirconium oxide
Titanium oxide
Zinc sulfite
Antimony trioxide

All of the adulterants mentioned are used in the small quantities indicated so as not to unduly deteriorate the unique properties of the base compositions. Undoubtedly other additives will be discovered for specific purposes as the use of the material becomes more extensive.

It is apparent that a wide range of industrial instrumentation for use in high temperature applications become available by reason of the discovery of the coating material herein set forth. Although it has been possible to apply vitreous enamel coatings to such metals as copper, this having been done heretofore principally for decorative purposes, I am not aware of any coating which has been successfully demonstrated for use with stainless steel, Inconel, glass, refractories and other basic material required in the construction of rugged scientific and industrial instruments, and which possesses the necessary electrical properties of the present material.

I claim:

1. A vitreous enamel which consists of a relatively minor proportion of a frit and a relatively major proportion of a flux, the frit comprising a mixture of from about 10% to about 50% by weight of zinc oxide, from about 10% to about 50% by weight of cobalt oxide and from about 10% to about 50% by weight of silicon oxide, and the flux comprising a mixture of from about 40% to about 75% by weight of lead borate and from about 25% to 60% by weight of lead borosilicate.

2. A vitreous enamel which consists of from about 2% to about 40% by weight of a frit and from about 60% to about 98% by weight of a flux, the frit comprising from about 10% to about 50% by weight of zinc oxide, from about 10% to about 50% by weight of cobalt oxide and from about 10% to about 50% by weight of silicon oxide, and the flux comprising a mixture of from about 40% to about 75% by weight of lead borate and from about 25% to about 60% by weight of lead borosilicate, the silicon oxide being present in the final mixture in an amount not less than about 1% by weight.

3. A vitreous enamel which consists of about one part by weight of a frit and about nine parts by weight of a flux, the frit comprising a mixture of about equal parts by weight of zinc oxide, cobalt oxide and silicon oxide and the flux comprising a mixture of about 65% by weight of lead borate and about 35% by weight of lead borosilicate.

4. The method of compounding a vitreous enamel of a composition consisting as a frit a mixture having by weight from 10% to 50% zinc oxide, from 10% to 50% cobalt oxide and from 10% to 50% silicon oxide and as a flux a mixture having by weight from 40% to 75% lead borate and from 25% to 60% lead borosilicate, which method comprises intimately mixing the components of the frit in dry form, fusing the frit mixture at a temperature between about 2000° F. and 2800° F., grinding the fused mixture to a fine powder, mixing the components of the flux in dry powder form, and thereafter mixing from 2% to about 40% by weight of the fused and powdered frit with from about 60% to about 98% by weight of the powdered flux.

5. The method of compounding a vitreous enamel of a composition consisting as a frit a mixture of about equal parts by weight of zinc oxide, cobalt oxide and silicon oxide and as a flux a mixture of about 65% by weight of lead borate and about 35% by weight of lead borosilicate, which method comprises intimately mixing the components of the frit, fusing this mixture at a temperature of approximately 2400° F., grinding the fused mixture to a powder of approximately 400 mesh size, separately mixing the components of the flux in dry powder form, and thereafter mixing about one part by weight of frit with about nine parts by weight of flux.

References Cited in the file of this patent

UNITED STATES PATENTS

| | | |
|---|---|---|
| 2,397,004 | Harbert et al. | Mar. 19, 1946 |
| 2,551,712 | Soby | May 8, 1951 |
| 2,568,847 | Deyrup | Sept. 25, 1951 |
| 2,587,523 | Prescott | Feb. 26, 1952 |
| 2,642,364 | Beatty et al. | June 16, 1953 |
| 2,699,399 | Armistead | Jan. 11, 1955 |

FOREIGN PATENTS

| | | |
|---|---|---|
| 233,295 | Great Britain | May 14, 1925 |